United States Patent [19]

Itagaki et al.

[11] Patent Number: 5,576,773
[45] Date of Patent: Nov. 19, 1996

[54] TELEVISION RECEIVER WHICH CONTROLS THE PROGRAM RESERVE IN A VCR

[75] Inventors: Tsuguo Itagaki, Yokohama; Hideo Tomita, Ebina; Sigeya Tanaka, Gifu, all of Japan

[73] Assignee: Hitachi, Ltd., Tokyo, Japan

[21] Appl. No.: 267,478

[22] Filed: Jun. 28, 1994

[30] Foreign Application Priority Data

Jul. 7, 1993 [JP] Japan .................................. 5-167719
Oct. 20, 1993 [JP] Japan .................................. 5-262093

[51] Int. Cl.$^6$ ..................................................... H04N 5/44
[52] U.S. Cl. ............................................. 348/734; 386/96
[58] Field of Search ........................... 358/335; 348/734; 341/176; 359/142, 146; 455/151.1, 151.2

[56] References Cited

U.S. PATENT DOCUMENTS 5,065,235 11/1991 Iijima .

FOREIGN PATENT DOCUMENTS

| | | |
|---|---|---|
| 62-060372 | 3/1987 | Japan . |
| 01-212096 | 8/1989 | Japan . |
| 04-239888 | 8/1992 | Japan . |
| 04-259174 | 9/1992 | Japan . |
| 05-103275 | 4/1993 | Japan . |

*Primary Examiner*—Victor R. Kostak
*Assistant Examiner*—Nathan J. Flynn
*Attorney, Agent, or Firm*—Fay, Sharpe, Beall, Fagan, Minnich & McKee

[57] ABSTRACT

A television receiver includes a unit for controlling program reserve, a storage unit for storing previously remocon codes of an external picture recording apparatus in a memory of the control unit, an output terminal for outputting the remocon code corresponding to a predetermined function at a predetermined time, and a wire unit having one end connected to the output terminal and the other end to which an infrared ray signal emitting portion driven by the remocon code output is connected, and operates in such a way that in response to an instruction issued from the program reserve controlling unit, the remocon code corresponding to the necessary function is output from the remocon code storing unit to drive the infrared ray signal emitting portion, and an output of the infrared ray signal emitting portion is received by a remocon light receiving portion of the external picture recording apparatus, thereby enabling the picture recording reserve in the external picture recording apparatus to be controlled.

4 Claims, 9 Drawing Sheets

FIG. 8

```
                    RESERVE SETTING

RESERVE : PROGRAM RESERVE    RECORDING RESERVE 3   1   3   8   4

INPUT NUMERAL AFTER SELECTING
             RESERVE WITH  ◁ ▷
```

FIG. 9

| NO | RESERVE | CH | DATE | START TIME | | END TIME |
|---|---|---|---|---|---|---|
| 1 | PROGRAM | 12 | 15 WED | AM 8:00 | ∼ | AM 9:00 |
| 2 | RECORDING | 10 V | 15 WED | PM 11:00 | ∼ | PM 11:30 |
| 3 | -- | -- | --- | --:-- | ∼ | --:-- |
| 4 | -- | -- | --- | --:-- | ∼ | --:-- |
| 5 | -- | -- | --- | --:-- | ∼ | --:-- |

FIG. 12

| FUNCTION OF VTR | REMOCON CODE |
|---|---|
| POWER SOURCE ON | 10 H |
| POWER SOURCE OFF | 11 H |
| PLAY | 14 H |
| STOP | 15 H |
| RECORD | 20 H |
| FAST FORWORD | 21 H |
| REWIND | 22 H |
| CH 1 | 31 H |
| CH 2 | 32 H |
| ⋮ | ⋮ |
| ⋮ | ⋮ |
| BS 1 | 51 H |
| BS 2 | 52 H |
| ⋮ | ⋮ |

FIG. 13

(1)
```
RESERVE SETTING
┌─────────────┐  ┌─────────────┐
│  PROGRAM    │  │  RECORDING  │
│  RESERVE    │  │  RESERVE    │
└─────────────┘  └─────────────┘
```

(2)
```
RESERVE SETTING
                  ┌─────────────┐
                  │  RECORDING  │
                  │   RESERVE   │
                  └─────────────┘
1 RESERVE DATE      MONTH☐ DAY☐
```

(3)
```
RESERVE SETTING
                  ┌─────────────┐
                  │  RECORDING  │
                  │   RESERVE   │
                  └─────────────┘
1 RESERVE DATE     MONTH 10 DAY 21
2 START TIME            ☐ : ☐
```

(4)
```
RESERVE SETTING
                  ┌─────────────┐
                  │  RECORDING  │
                  │   RESERVE   │
                  └─────────────┘
1 RESERVE DATE     MONTH 10 DAY 21
2 START TIME            19 : 30
3 END TIME              ☐ : ☐
```

(5)
```
RESERVE SETTING
                  ┌─────────────┐
                  │  RECORDING  │
                  │   RESERVE   │
                  └─────────────┘
1 RESERVE DATE     MONTH 10 DAY 21
2 START TIME            19 : 30
3 END TIME              21 : 00
4 CHANNEL              ▭
```

(6)
```
RESERVE SETTING (1)
                  ┌─────────────┐
                  │  RECORDING  │
                  │   RESERVE   │
                  └─────────────┘
1 RESERVE DATE     MONTH 10 DAY 21
2 START TIME            19 : 30
3 END TIME              21 : 00
4 CHANNEL                1 CH
```

FIG. 14
(1)
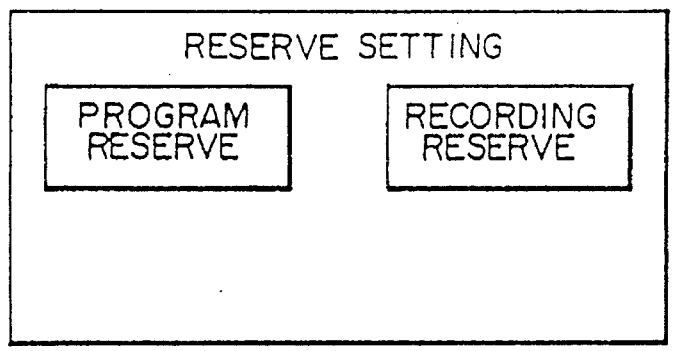
(2)
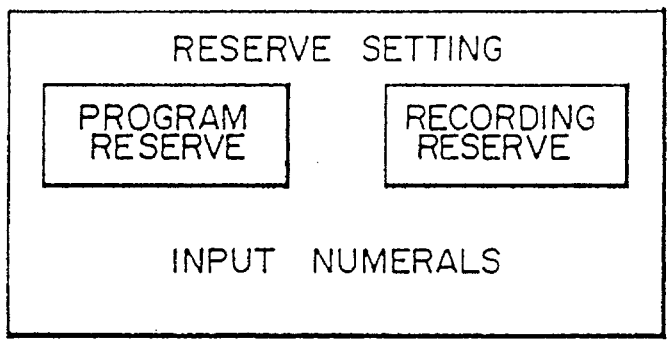
(3)
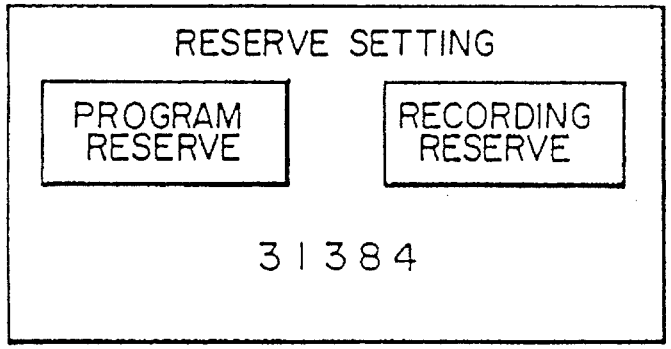

FIG. 15

| MAKERS | MAKER CODES ||
| --- | --- | --- |
| | UNCONTAINING OF BS TUNER | CONTAINING OF BS TUNER |
| A | 01 ~ 04 | 51 ~ 54 |
| B | 05 ~ 09 | 55 ~ 59 |
| C | 10 ~ 13 | 60 ~ 63 |
| D | 14 ~ 15 | 64 ~ 65 |
| E | 16 ~ 18 | 66 ~ 68 |
| F | 19 ~ 21 | 69 ~ 71 |
| G | 22 ~ 23 | 72 ~ 73 |
| H | 25 ~ 28 | 75 ~ 78 |
| I | 29 ~ 30 | 79 ~ 80 |
| J | 31 | 81 |

TELEVISION RECEIVER WHICH CONTROLS THE PROGRAM RESERVE IN A VCR

BACKGROUND OF THE INVENTION

The present invention relates, in general, to timer picture recording by a picture recording apparatus (in the present invention, a video tape recorder (VTR) will hereinafter be described as an example of the picture recording apparatus), and more particularly to the picture recording control of a television receiver (hereinafter, referred to as "a television" for short, when applicable) which has a function of commanding the VTR to record a scene on a video tape so that in accordance with the picture recording command issued from the television, the VTR records automatically a scene on a video tape.

Heretofore, in the case where a desired channel of a television was subjected to the timer picture recording by a VTR, on the VTR side, the timer picture recording was performed on the basis of the picture recording reserve. As for the public known example relating thereto, there is JP-A-1-212096.

In the above-mentioned prior art, for example, in the case where a desired broadcasting via satellite (hereinafter, referred to as "a BS" for short, when applicable) channel was intended to be subjected to the picture recording by a VTR which did not contain a BS tuner, it was necessary that the video and sound signals, relating to,the desired BS channel, output from the television containing a BS tuner were connected to an external input terminal of the VTR so that the timer picture recording was performed on the VTR side. As for the method in this case, there are known (1) a method in which the desired channel is fixed so that the picture recording channel is not changed by mistake by the operation for selecting a television broadcast (i.e., a broadcasting TV station), and under this condition, the picture recording is performed by the VTR, (2) a method in which the television is provided with the same function of reserving a program as that of the VTR and the picture recording is performed with the television synchronized with the VTR, (3) a method in which the channels of the television are controlled on the VTR side by the wired control bus, thereby performing the timer picture recording, and so forth. With respect to the method (1), since the picture recording channel is fixed, only one channel can be subjected to the reserve of the picture recording. With respect to the method (2), the program reserve needs to be performed on the television side and the VTR side, respectively. Therefore, there arises the problem that the reserve operation takes a great deal of time, and also the malsetting readily occurs such that the reserved recording contents are different from each other. In addition, with respect to the method (3), the realization can be readily performed if the maker of the television is the same as that, of the VTR. In the case where the maker of the television is different from that of the VTR, however, there arises the problem that it is difficult to standardize the communication procedures between the different makers.

SUMMARY OF THE INVENTION

It is therefore an object of the present invention to provide a television receiver which enables readily the timer picture recording even in the case where the maker of a television is different from that of a VTR.

In order to attain the above-mentioned object, a television is provided, in addition to a program reserve facility for reserving and executing a desired channel at a desired time, a picture recording reserve facility for performing the control so as to record the desired channel in an external picture recording apparatus such as a VTR, and with respect to the execution of the picture recording reserve by the external picture recording apparatus such as a VTR, a command for selecting, if it becomes a predetermined time, the channel which is previously reserved to set a recording mode is transmitted from the television to the external picture recording apparatus such as a VTR through a transmission line which is constituted by a wire or a wireless channel such as infrared rays and is provided between the television and the external picture recording apparatus such as a VTR, whereby the above-mentioned problems associated with the prior art are solved.

In recent years, the remocon device utilizing the infrared rays has been widely popularized in all the electronic apparatuses, in particular in the household electronic apparatuses. To the television and the VTR, such a remocon device has been widely applied as if considered as its typical example. The present invention is constructed in such a way that the remocon codes of the VTR are stored in the inside of the television so that the channel which is intended to be picture-recorded can be subjected to the picture recording reserve at a desired time on the television side, and for the television, a remocon signal generator is prepared which operates to generate infrared ray remocon signals to the VTR in accordance with the stored remocon codes of the VTR, and when it becomes time to start the picture recording which is previously reserved, the remocon codes for turning a power supply on, selecting a television broadcast and recording a scene on a video tape are transmitted from the television to the VTR through the remocon signal generator, and when it becomes time to end the picture recording, the remocon codes for stopping the picture recording and turning the power supply off are transmitted, whereby the VTR performs the picture recording in accordance with those remocon codes supplied from the television, that is, the VTR receives the remocon codes supplied from the television to a remocon receiver contained in the VTR itself, and operates to perform the picture recording just as if a user instructs a remocon device for the VTR to perform the picture recording.

BRIEF DESCRIPTION OF THE DRAWINGS

FIG. 8 is a view showing an example (1) displayed on a cathode ray tube;

FIG. 9 is a view showing an example (2) displayed on the cathode ray tube;

FIG. 12 is a view showing an example of the correspondence between the functions of a VTR and remocon codes;

FIG. 13 is a view showing an example displayed on the cathode ray tube, in the case where the reserve of the picture recording is performed, useful in explaining a state in which the displayed contents are successively determined every the reserve item;

FIG. 14 is a view showing an example displayed on the cathode ray tube in the case where the reserve of the picture recording is performed using a numerical code called the G code; and FIG. 15 is a view showing an example of maker codes corresponding to respective makers.

DESCRIPTION OF THE PREFERRED EMBODIMENTS

Figure 1:
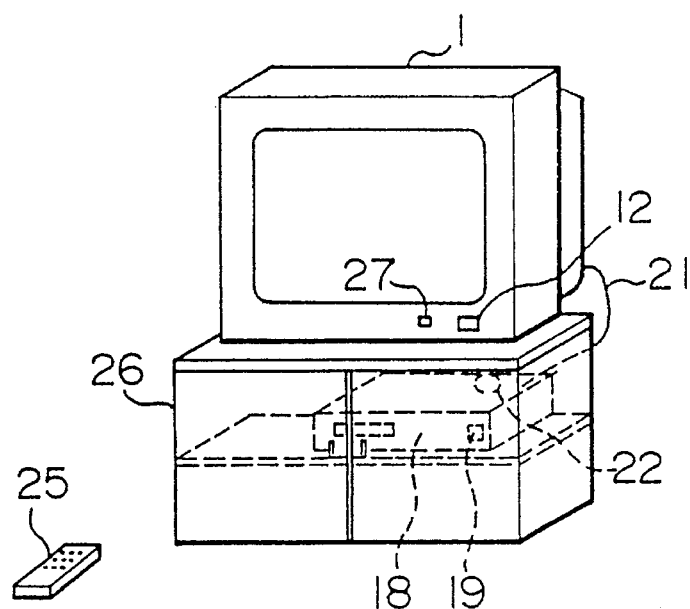
FIG. 1 is a schematic view showing a structure of a system of an embodiment according to the present invention.

FIG. 1 is a schematic view showing a structure of a system, for controlling the picture recording in a VTR from the television side, of an embodiment according to the present invention. The example shown in the figure shows a case where on the basis of the assumption of the typical state of installation of both a television and a VTR in a home, a television 1 is placed on a television base 26 and a VTR 18 is accommodated in the television base 26. To the television 1, a remocon portion 22 for emitting the infrared rays which is mounted to an end portion of a connection cable 21 is connected through the connection cable 21. In the example shown in the figure, the remocon infrared ray emitting portion 22 is arranged in the television base 26 so as to be near a remocon light receiving portion 19 of the VTR 18. While what kind of a signal the remocon infrared ray emitting portion 22 outputs will be described in detail later, the remocon light receiving portion 19 of the VTR 18 detects the infrared ray signal supplied from the remocon infrared ray emitting portion 22 so that the control of the picture recording in the VTR 18 is performed.

Figure 2:
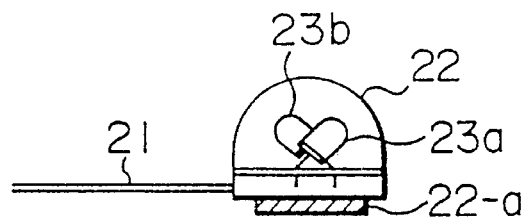
FIG. 2 is a cross sectional view showing a structure of a remocon infrared ray emitting portion 22 shown in FIG. 1.

FIG. 2 is a cross sectional view showing an example of the inside of the remocon infrared ray emitting portion 22 shown in FIG. 1. Infrared ray emitting diodes 23a and 23b are provided in the hemispherical remocon infrared ray emitting portion 22. In this connection, the infrared ray emitting diodes 23a and 23b are arranged in such a way that the light emission axes intersect each other so as to reduce the directivity and to radiate the infrared rays spreadably in the wide range. In addition, if a fixing member 22a such as a magnet is, as shown in FIG. 2, mounted to the bottom surface of the remocon infrared ray emitting portion 22 so as to enable the portion 22 to be fixed to the television base 26 or the cover of the VTR 18, the management thereof will be convenient.

Figure 3:
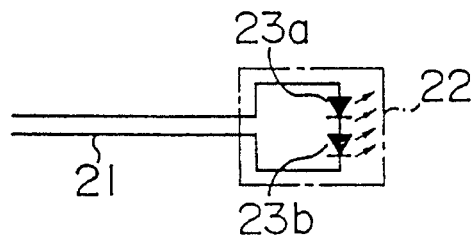
FIG. 3 is a circuit diagram showing a configuration of an internal circuit of the remocon infrared ray emitting portion 22 shown in FIG. 1.

FIG. 3 is a circuit diagram showing a configuration of an internal circuit of the remocon infrared ray emitting portion 22. This example is an example wherein in the remocon infrared ray emitting portion 22, the infrared ray emitting diodes 23a and 23b are connected in series with each other. However, even if the relative positional relationship between the infrared ray receiving portion 19 of the VTR 18 and the remocon infrared ray emitting portion 22 should be changed, the enough emission output to enable the VTR to operate has only to be obtained. From this viewpoint, the circuit configuration of the remocon infrared ray emitting portion 22 is not limited to the configuration shown in FIG. 3.

In FIG. 1, the other end of the connection cable 21 to one end of which the remocon infrared ray emitting portion 22 is mounted is connected to the television 1. However, since the connection cable 21 extends necessarily between the inside and the outside of the television base 26, it is more convenient that the other end of the connection cable 21, which is to be connected to the television 1, is detachable.

Figure 4:
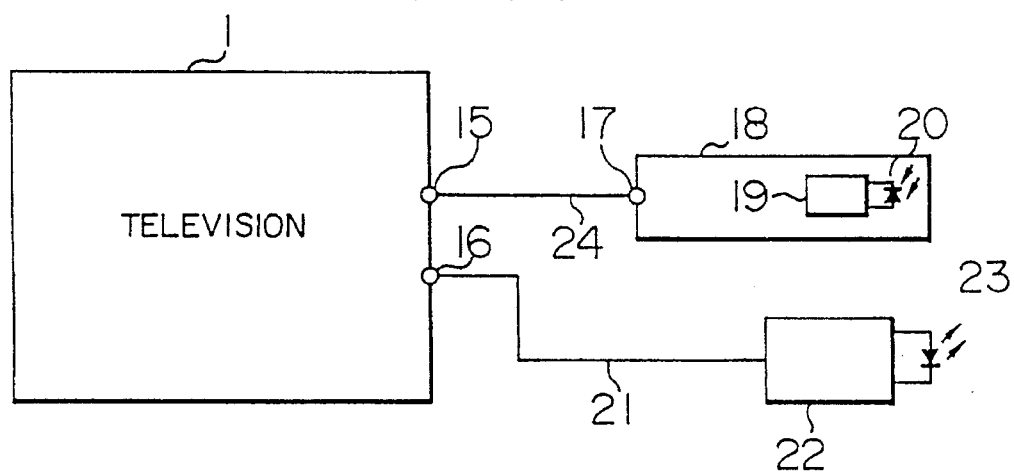
FIG. 4 is a block diagram, partly in circuit diagram, showing a configuration of an I/O terminal and a remocon light emitting/light receiving portion shown in the view of the system structure of FIG. 1.

FIG. 4 is a view of an example showing only a portion relating to the present invention with respect to the connection between the television 1 and the VTR 18. In the case where the VTR 18 does not contain a BS tuner, the television 1 includes a BS output terminal 15 for supplying the video signal and the sound signal which have been obtained by the demodulation in a BS tuner contained in the television 1 after the reception of the input signal to the VTR 18, and the output of the BS output terminal 15 is connected to an external input terminal 17 of the VTR 18 through a connection cable 24 so that the video signal and the sound signal of the selected BS channel are supplied to the VTR 18.

The VTR 18 which can be operated by the infrared ray remocon is an object of the present invention and includes a remocon light receiving portion 19 having an infrared ray receiving photodiode 20 for receiving an infrared ray signal supplied from a remocon transmitter (not shown in FIG. 4) of the VTR 18 itself. Therefore, when the remocon codes of the VTR 18 are previously stored in the television 1, and the codes corresponding to the power source on, the channel selection, the picture recording and the like are modulated with a predetermined frequency to be output as a remocon signal to a picture recording control output terminal 16, the infrared ray remocon signal is generated by the remocon infrared ray emitting portion 22 and then is received by the remocon light receiving portion 19, thereby performing the remote control. That is, the VTR 18 is operated by the remocon transmitter (not shown) contained in the VTR 18 itself and also is controlled by a control signal output from the television 1. In this case, if a wavelength of the infrared rays, which are emitted from the remocon infrared ray emitting portion 22, is approximately equal to that of the infrared rays which are emitted from the remocon transmitter of the VTR 18 itself, the transmission efficiency will be increased and the operation will be performed in a preferable manner even under the condition of the low power.

Figure 5:
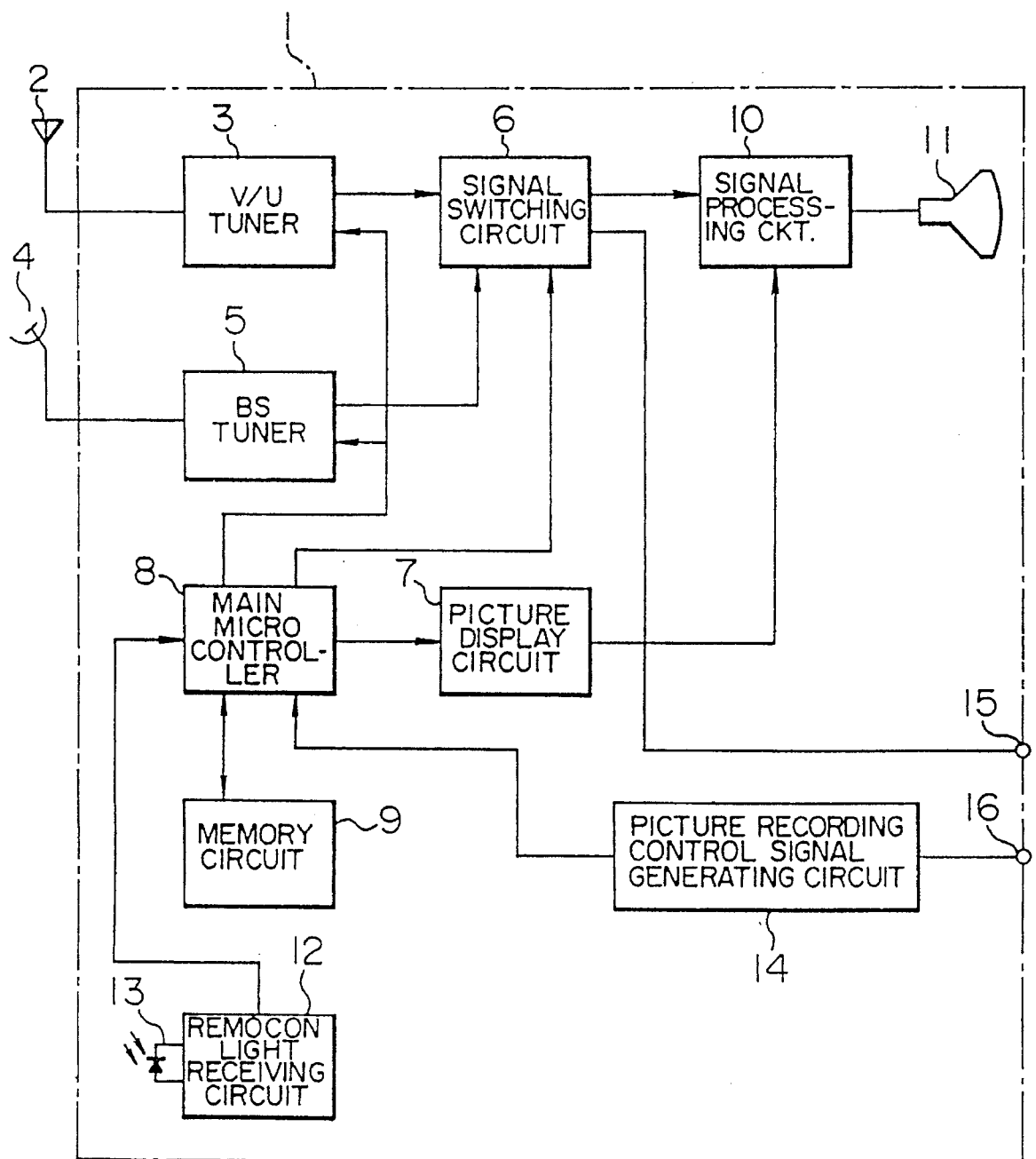
FIG. 5 is a block diagram showing an internal configuration of a television receiver 1.

FIG. 5 shows an internal configuration of the television 1. In the figure, from an input signal which has been received by a VHF/UHF antenna 2, a video signal and a sound signal of a desired V/U channel are obtained through a V/U tuner 3 which has the function of detecting and amplifying a signal having an intermediate frequency. On the other hand, an input signal of a desired BS channel which has been received by a BS antenna 4 is converted into a signal having an intermediate frequency of about 1 GHz by a converter contained in the BS antenna 4 and then is input to a BS tuner 5 which has the function of detecting and amplifying a signal having an intermediate frequency, thereby obtaining a video signal and a sound signal of the desired BS channel. The video signal and the sound signal of the V/U channel and those of the BS channel are respectively input to a circuit 6 for switching a signal. From the signal switching circuit 6, the video signal and the sound signal of the BS channel are supplied to a BS output terminal 15, and the video signal is supplied to a circuit 10 for processing a signal. Then, the signal processing circuit 10 separates the video signal supplied from the signal switching circuit 6 into a luminance signal, a chrominance signal, a synchronous signal and the like and also superimposes a picture display signal supplied from a picture display circuit 7 on the video signal consisting of the luminance signal and the chrominance signal to display the resultant signal on a cathode ray tube 11. The picture display circuit 7 contains, in order to display the information relating to the channel number, the contents of the picture recording reserve, and the like on the cathode ray tube 11, a character generator and supplies the picture display signal consisting of R, G, B and a blanking signal to the signal processing circuit 10. A circuit 14 for generating a picture recording control signal is controlled on the basis of a serial control data including the information relating to a control command and a channel number by a main microcontroller 8. The picture recording control signal is converted into a remocon signal train which has been produced on the basis of the serial control data to be output from a picture recording control signal output terminal 16. A memory circuit 9 stores the channel information relating to the receivable channel number and the like, and the reserve information relating to a picture recording start time, a picture recording end time, a picture recording channel and the like and is also used as a backup memory when an AC power source is cut off due to the service interruption. The main microcontroller 8 is connected to the V/U tuner 3, the BS tuner 5, the signal switching circuit 6, the picture display circuit 7, the picture recording control signal generating circuit 14, the memory circuit 9 and a remocon light receiving circuit 12 contained in the television 1 itself to control those circuits. The remocon light receiving circuit 12 of the television 1 itself includes a photodiode 13 for receiving the infrared rays to convert an infrared ray remocon signal into a remocon signal as an electric signal. The remocon signal which has been output from the remocon light receiving circuit 12 of the television 1 itself is decoded by the main microcontroller 8 so that the selection of the channel, and the setting, correction or cancellation of the contents of the picture recording reserve which are displayed on the cathode ray tube 11 are performed.

Figure 6:
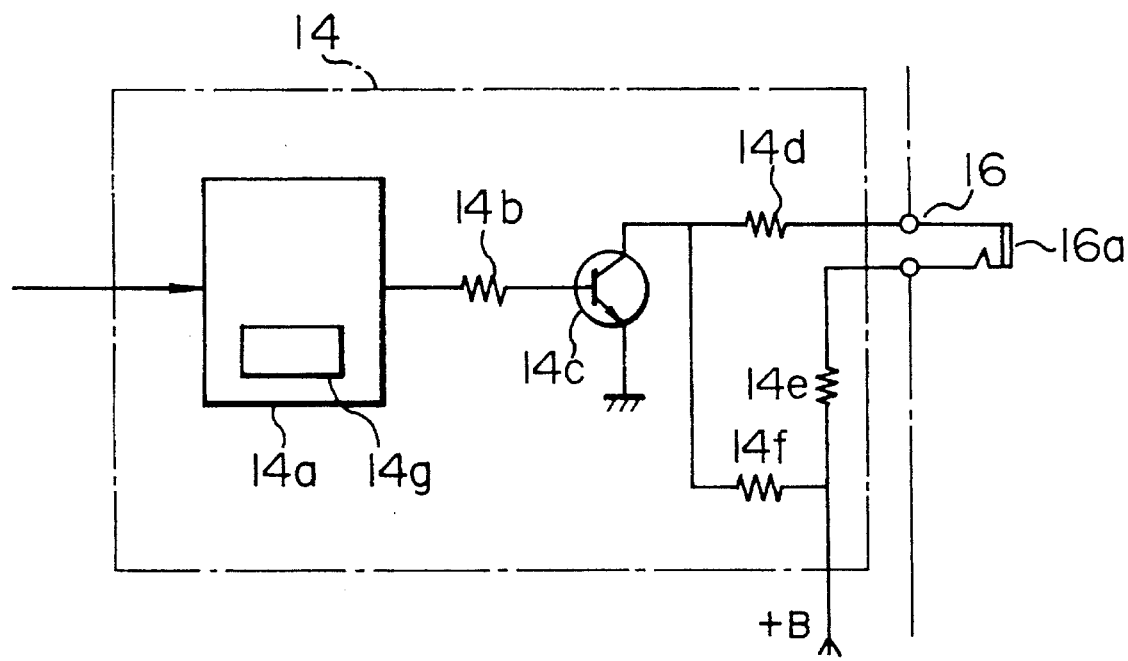
FIG. 6 is a circuit diagram showing an internal configuration of a circuit 14 for generating a picture recording control signal shown in FIG. 5.

FIG. 6 shows an internal configuration of the picture recording control signal generating circuit 14. In the figure, the remocon codes corresponding to the functions of the VTR 18 as shown in FIG. 12 are stored in a memory area 14g in a submicrocontroller 14a, and thus the remocon signal can be output which has been obtained by modulating the carrier, which is previously determined on the basis of the serial control data from the main microcontroller 8 with the desired remocon code. The remocon signal thus output is connected to a base terminal of a drive transistor 14c which operates to drive the infrared ray emitting diode 23 through a resistor 14b. Resistors 14d and 14e operate to limit the drive current for the infrared ray emitting diode 23, and a resistor 14f operates to prevent the recovery time (the rise time) when the drive transistor 14c is turned off due to the floating capacity of the connection cable 21 from being delayed. In addition, a jack 16a is a jack portion of the picture recording control output terminal 16 in which a miniplug connected to the end portion of the remocon infrared ray emitting portion 22 is plugged, and also is detached therefrom when both the television 1 and the VTR 18 are installed as described above and the remocon infrared ray emitting portion 22 is unnecessary.

Figure 7:
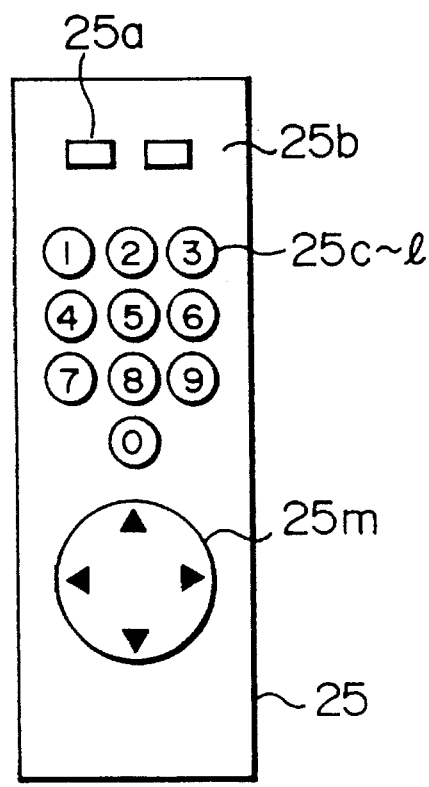
FIG. 7 is an exterior view of a remocon transmitter 25.

FIG. 7 is a schematic diagram of a remocon transmitter 25 showing only minimum keys relating to the present embodiment. In the figure, the reference numeral 25a designates a reserve key for commanding the reserve, the reference numeral 25b designates a test key for testing whether or not the picture recording channel commanded to the VTR 18 is proper, the reference numerals 25c to 25l designate ten keys which correspond to the numerals 0 to 9, respectively and are used to input the desired numeral or numerals and to select the channel in the reserve operation, and the reference numeral 25m designates a cursor key for moving the selected position in the menu picture, the reserve setting or the reserve contents displayed on the cathode ray tube 11 in all directions.

FIG. 13 shows an example of the contents of the reserve setting which are displayed on the cathode ray tube 11 of the television 1. When the reserve key 25a is pressed down with the remocon transmitter 25 of the television 1 directed to the infrared ray receiving portion of the television 1, the main microcontroller 8 commands the picture display circuit 7 to display the reserve picture for the reserve setting as shown in FIG. 13(1). Then, by pressing down the right and left portions of the cursor key 25m, it is selected whether the desired reserve is the program reserve as the reserve only in the television 1 or the picture recording reserve by which the scene is to be recorded in the VTR 18. If the picture recording reserve is selected, the screen of the television 1 shows the contents of FIG. 13(2), and the assignment of the date to be reserved as the next item is waited. In this connection, in FIG. 13(2), there is shown an example in the case where the picture recording reserve is selected and the characters of "Program Reserve" are erased. However, in this case, alternatively, the method may also be adopted such that without erase of the characters of "Program Reserve", the characters of "Recording Reserve" are left by using the different color or are flashed. When in FIG. 13(2), the date to be reserved is input using the ten keys 25c to 25l, the screen of the television 1 shows the contents of FIG. 13(3), and the input of the reserve start time is waited. In such a way, when the input of all the necessary items such as the end time and the channel to be selected has been completed, all the items thus input are displayed as shown in FIG. 13(6), and then if the reserve key 25a is pressed down again, the reserve operation will be completed.

While in the above-mentioned example, a user inputs the reserve items one item by one item, such an input method is troublesome because of the multiple input items, and in addition thereto, there is a suspicion that the operation is difficult. In recent years, the method employing the bar code and the simple method called the G code produced by Gemstar Co. Ltd. in which the date, the channel, the picture recording start time, the picture recording end time and the like are collectively coded in the form of a numeral having some figures, and the resultant numeral is input to perform the reserve have been adopted in many cases, and such codes have appeared in the program column of the newspapers and the magazines in many cases. If that G code method is employed, the reserve can be more simply performed. FIG. 14 shows an example of the picture in the case where the G code method is employed. The contents shown in FIG. 14(1) are displayed in the same manner as that in those of FIG. 13(1) when pressing down the reserve key 25a. Then, when the picture recording reserve is selected using the cursor key 25m, the characters of "Recording Reserve" are, as shown in FIG. 14(2), displayed with the color of those characters changed (shown by the hatching in the figure), and thus the display for urging the input of the reserve code called the G code is performed. When the user reads out the desired reserve code from the program column of the newspaper or the magazine to input the reserve code thus read, the screen of the television 1 shows the contents of FIG. 14(3). Then, when pressing down the reserve key 25*a* again, the main microcontroller 8 decodes the numeral thus input into the data relating to the date, the channel, the picture recording start time and the picture recording end time, thereby displaying a reserve table as shown in FIG. 9. In the figure, No. 1 shows the reserve contents which have already been reserved, and the contents which is newly reserved at this time are displayed in No. 2. In this connection, "Program" and "Recording" which are displayed below "Reserve" represent "Program Reserve" and "Recording Reserve", respectively, the numeral which is displayed below "CH" represents the reserved channel, and "V" which is displayed beside that numeral represents that the reserved channel was selected by the VTR 18. FIG. 9 shows an example of the table. In this connection, as long as it is possible to discriminate whether the desired reserve is "Program Reserve" or "Recording Reserve" and whether the channel of interest is the channel of the television 1 or the channel of the VTR 18, even if other methods are employed, there is no problem.

Referring back to FIG. 1, an LED 27 which is provided in a lower position of the front face of the television 1 is an LED which emits the rays in order to distinguish whether the reserved contents of the television 1 is the program reserve or the picture recording reserve of the VTR 18. The LED 27 emits the green rays in the program reserve and emits the red rays in the picture recording reserve. In such a way, a distinction between the program reserve and the picture recording reserve is performed. In the case where a plurality of reserve was performed, both the program reserve and the picture recording reserve may be set at the same time in some cases. However, at that time, the LED 27 serves to display the picture recording reserve top priority and as a result the LED 27 emits the red rays. The remocon transmitter 25 for TV is operated so as to be directed to the infrared ray receiving portion 12 of the television 1 and thus operates to select the channel of the television 1, and set, correct or cancel the contents of the program reserve and the picture recording reserve which are displayed on the cathode ray tube 11.

Figure 10:
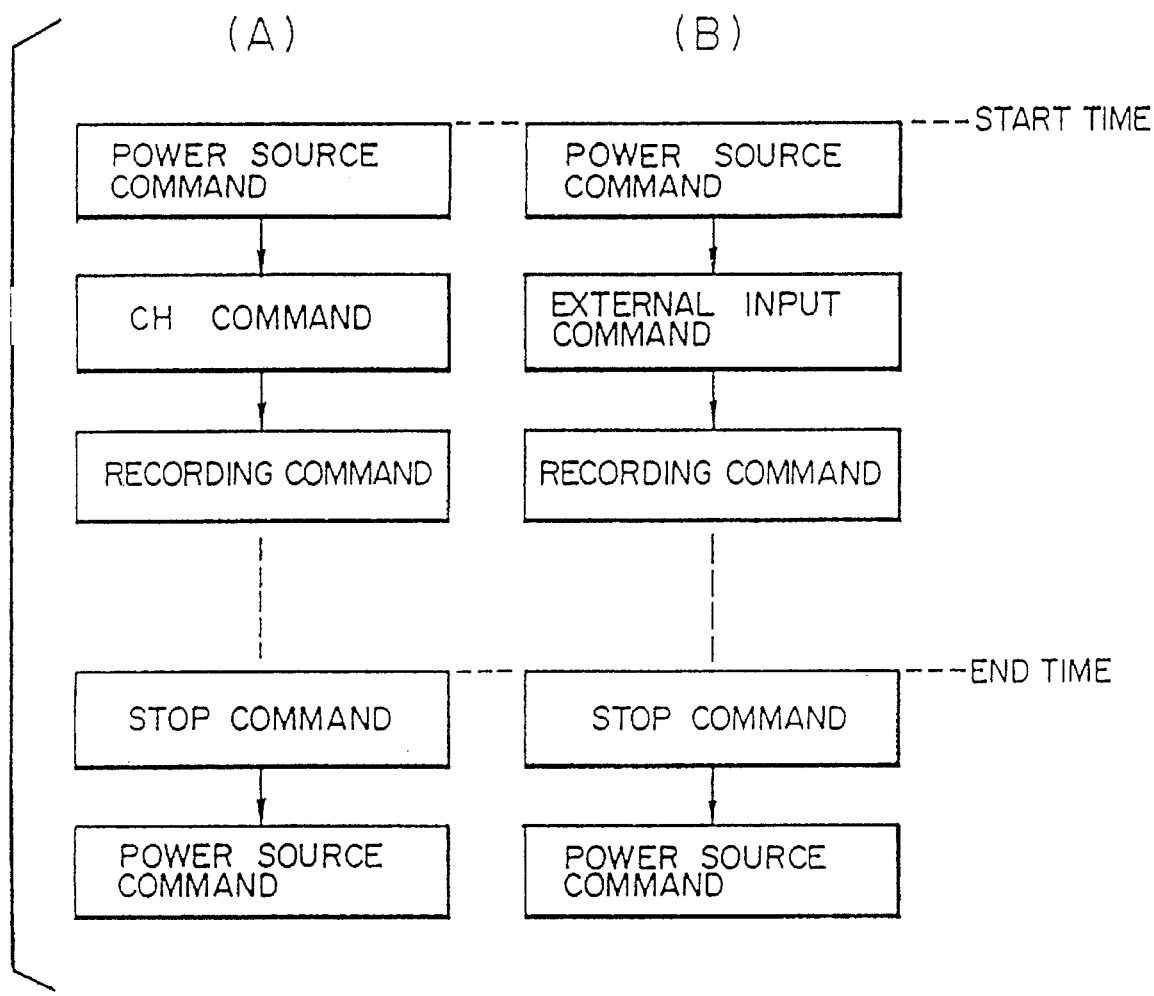
FIG. 10 is a view showing a command procedure in the picture recording control.

Next, the execution of the reserve will hereinbelow be described. Assuming that the present date is 15, when it becomes AM 8:00, since the program reserve is previously set, the main microcontroller 8 turns the power source of the television 1 on (but, when the power supply has already been turned on, the state is not changed) and controls the V/U tuner 3 to select Channel 12. If no key operation by the remocon transmitter 25 is performed until the end time, the main microcontroller 8 operates to turn the power source off at the end time of AM 9:00. When it becomes PM 11:00, since the picture recording reserve is previously set, the main microcontroller 8 supplies the maker code which is previously selected on the basis of the menu picture, and the control signals for the power source, CH and the picture recording command to the submicrocontroller 14*a*. Then, the submicrocontroller 14*a* outputs the power source command, the CH command and the picture recording command which are set as shown in FIG. 10(A) from the remocon infrared ray emitting portion 22. When it becomes the end time of PM 11:30, likewise, the stop command and the power source command are output, thereby completing the timer picture recording.

With respect to the timing when the commands shown in FIG. 10(A) are issued, if the REC command is issued slightly before the picture recording start time and also the stop command is issued slightly after the picture recording end time, the difference between the time in the broadcasting station and that in the timer contained in the television 1 can be absorbed, and also the picture recording of the desired channel is performed rightly. It is, of course, to be understood that both the power source command and the CH command for starting the reserve should be issued before the issue of the picture recording command, and at the time point when the REC command is issued, the VTR should be in the state in which the picture recording can be performed, and also the power source command for turning the power source off should be issued after the issue of the stop command.

Now, in response to the power source command, normally, the power source of the VTR may perform the operation in which the state is inverted every reception of the command, the so-called "the toggle operation" in many cases. In such cases, in response to the power source command, the state of the VTR may become unstable in some cases. Therefore, the single command for turning the power source on or off is previously set so as to be issued prior to the toggle command. In addition, in the case where only the toggle command is issued, in the state in which the picture recording is set, the power source of the VTR is previously turned off, whereby it is possible to cope therewith.

With respect to the picture recording reserve of the BS channel, the operation depends on whether or not the BS tuner is contained in the VTR 18. The information relating to whether or not the VTR 18 used contains the BS tuner is, together with the remocon code table shown in FIG. 12, previously stored in the memory provided in the picture recording control signal generating circuit 14 of the television 1, or in the memory circuit 9 by the user. As a result, it is possible to judge whether the tuner of the television 1 or the tuner of the VTR 18 is used in the picture recording reserve. In the case where the VTR 18 contains the BS tuner, "V" can be displayed in the item of CH shown in FIG. 9. On the other hand, in the case where the VTR 18 does not contain the BS tuner, "V" can not be displayed.

The execution of the picture recording in the case where the VTR 18 contains the BS tuner is performed in such a way that the commands shown in FIG. 10(A) are output from the remocon infrared ray emitting portion 22 in a similar manner to that in the picture recording reserve by the above-mentioned V/U tuner. On the other hand, in the case where the VTR 18 does not contain the BS tuner, the commands shown in FIG. 10(B) are output from the remocon infrared ray emitting portion 22, thereby executing the picture recording reserve. In this case, since for the reserve, "V" is not displayed in the item of CH in the screen of the television 1, the desired channel is selected by the BS tuner 5 and then the video signal and the sound signal are output to the terminal 15. The difference between the contents of FIG. 10(A) and those of FIG. 10(B) is that the CH command in FIG. 10(A) is replaced with the external input command in FIG. 10(B). Out of various types, there are some types in which even if the VTR 18 receives the external input command from the remocon infrared ray emitting portion 22, it is impossible to select the external input. In this case, it is necessary that the input to the VTR 18 is previously made the external input by the user. If the VTR 18 receives the external input command, since the input of the picture recording signal is switched over to the video signal and the sound signal of the selected BS channel which are output to the terminal 15 of the television 1, the reverse picture recording of the desired BS channel can be performed.

Figure 11:
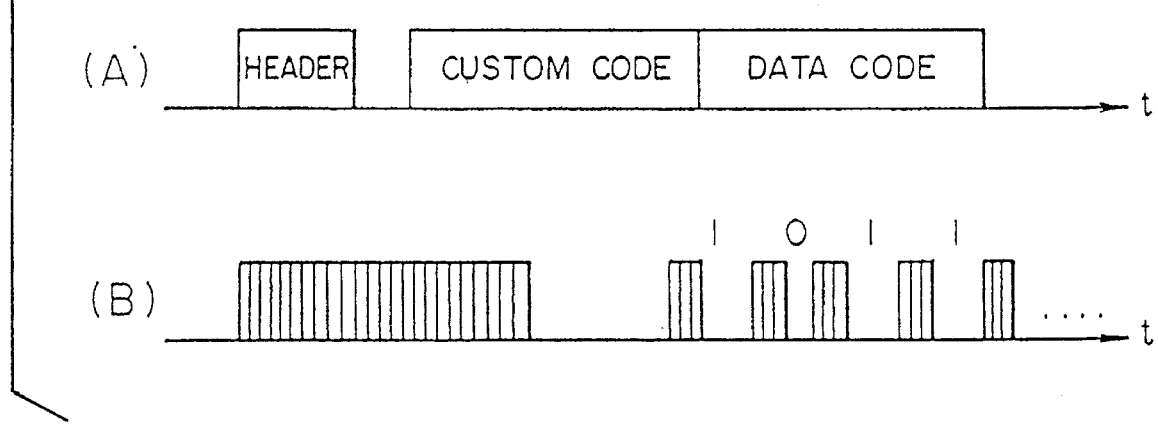
FIG. 11 is a timing chart showing an example of a command of remocon codes.

Now, the signals which are output from the remocon infrared ray emitting portion 22 are signals which are obtained by modulating the carrier having a predetermined frequency with the remocon codes corresponding to the individual commands. This is as shown in FIG. 11. FIG. 11(A) shows the remocon code signal, and FIG. 11(B) shows the infrared ray remocon signal which is obtained by modulating the carrier having a predetermined frequency with the remocon code signal of FIG. 11(A). In FIG. 11(A), there are shown the header representing the beginning of a series of data, the code called "the custom code" which is determined every maker or type, and the subsequent data code corresponding to the remocon function shown in FIG. 12. The custom codes for the VTR are determined so as not to cause the malfunction in the case where the maker of the television is different from that of the VTR. As shown in FIG. 15, the custom codes corresponding to the maker codes are assigned to the different makers. FIG. 15 shows an example in which the maker codes in the case where the VTR contains the BS tuner are different from those in the case where the VTR does not contain the BS tuner. Therefore, if those custom codes of the makers are, together with the remocon codes shown in FIG. 12, previously, inclusively stored in the memory in the picture recording control signal generating circuit 14 so that those can be selected on the basis of the maker codes, even when the maker of the television 1 is different from that of the VTR 18, the code corresponding to the maker of the VTR 18 used can be output from the television 1, and thus the picture recording reserve can be performed.

Confirming whether or not the picture recording channel is proper can be performed in such a way that when the items of CH is selected on the displayed screen of FIG. 9 by operating the cursor key 25m of the remocon transmitter 25 of FIG. 7 and then the test key 25b is pressed down, the same command as the CH command in the timer picture recording is transmitted to the VTR 18. In this case, to the remocon light receiving portion 19 of the VTR 18, both the infrared ray signal which is transmitted when pressing down the test key 25b of the remocon transmitter 25 and the infrared ray signal which is output from the remocon infrared ray emitting portion 22 are input at the same time. Therefore, the procedure may be available such that after a certain lapse of time after pressing down the test key 25b in order to prevent the malfunction due to both the signals, the infrared ray signal which has been obtained by the modulation on the basis of the remocon code is output from the remocon infrared ray emitting portion 22.

In the preferred embodiment of the present invention, both the main microcontroller 8 and the submicrocontroller 14b are individually provided as the controller. However, alternatively, one microcontroller may also be constituted by uniting both the main microcontroller and the submicrocontroller. In addition, the description has been given with respect to the method in which the remocon codes of the main other makers are previously stored in the submicrocontroller 14a. However, that method may also be constituted by the so-called "learning function" in which the procedure is displayed by the picture display circuit 7, the remocon code of the VTR 18 to be used is read by the infrared ray receiving portion 12 of the television 1, and the above-mentioned commands corresponding to the power source, the channels, the picture recording, and the stop are stored. In addition, in the present embodiment, as for the reserve method, the method based on the numeral input has been described. However, alternatively, the method may also be available such that by pressing down the reserve key 25a of the remocon transmitter 25 by two times, the reserve setting picture based on the numeral input as shown in FIG. 7 is skipped to call directly the reserve table as shown in FIG. 8. At this time, in addition to the confirmation of the reserve, the correction and cancellation of the channel, the date, the start time, the end time and the like, and the setting of the new reserve can be performed by operating the cursor key 25m of the remocon transmitter 25. Therefore, even in the case where the program is prolonged and in the case where the channel the numerical code of which does not appear in the program column of the newspaper and the like is reserved, likewise, the reserve can be performed without any impediment.

As set forth hereinabove, according to the television receiver of the present invention, even in the case where the maker of the television is different from that of the VTR and in the case where the VTR does not contain the BS tuner, the timer picture recording can be, including the BS channels, readily performed. In addition, on the basis of the same reserve method, the program reserve can also be readily performed.

In the present invention, any aspect other than the above-mentioned embodiment can be embodied without departing from the sprite of the invention or the main feature thereof. Therefore, it is to be understood that the above-mentioned embodiment is merely one simple example of the present invention in all respects, and thus should not be understood in a limiting sense. The scope of the present invention is shown by the scope of claims of the invention. In addition, all the modifications and the changes which belong to the equivalent range come within the scope of the present invention.

What is claimed is:

1. A television receiver comprising:

a program reserve control unit for controlling program reserve;

a storage unit for storing previously generated remocon codes of an external picture recording apparatus in a memory of said program reserve control unit;

a remocon output terminal for outputting a remocon code, of the stored remocon codes, corresponding to a predetermined function at a predetermined time;

a wire unit having one end connected to said remocon output terminal and another end connected to an infrared ray signal emitting portion driven by the remocon codes;

means, provided with a video and sound output terminal which outputs a video signal and a sound signal of channels of a receiving tuner in a predetermined frequency band, for responding to a command from said program reserve control unit, for outputting remocon codes from said storage unit storing said remocon codes, and for driving said infrared ray signal emitting portion to generate an output to be received by a remocon receiver of said external picture recording apparatus and to control a picture recording reserve of said external picture recording apparatus; and means, provided with a storage unit, for storing information representing whether or not said external picture recording apparatus includes said receiving tuner in a memory of said program reserve control unit, wherein on the basis of the information stored in said storage unit representing whether or not said external picture recording apparatus includes the receiving tuner, said program reserve control unit operates in such a way that in a case where said external picture recording apparatus includes the receiving tuner, said external picture recording apparatus receives, as an input, a signal output from the receiving tuner, and in a case where said external picture recording apparatus does not include the receiving tuner, said external picture recording apparatus receives, as an input, the video and sound signals of the desired receiving channel output from said television receiver, thereby enabling the picture recording reserve of the desired receiving channel to be executed.

2. A television receiver according to claim 1, wherein said memory of said program reserve control unit includes a storage unit for storing the remocon codes corresponding to the plural kinds of external picture recording apparatuses so that the remocon code corresponding to the external picture recording apparatus to be used can be selected, and in response to an instruction issued from said program reserve control unit, and there are included means for outputting said selected remocon code and key inputting means for testing whether the selected remocon code is right or not, thereby the selected remocon code is right or not, thereby the selected remocon code is outputting in a predetermined time later than an input timing from said key inputting means.

3. A television receiver according to claim 1, wherein a single command is previously set to a toggle command when the remocon code is outputted.

4. A television receiver comprising:
  a program reserve control unit which controls a program reserve;
  a storage unit of the program reserve control unit configured to store remocon codes of an external picture recording apparatus;
  a remocon output terminal, which is part of the program reserve control unit, for outputting remocon codes, of the stored remocon codes, corresponding to predetermined functions at predetermined times;
  a wire unit having one end connected to said remocon output terminal and another end connected to an infrared ray signal emitting portion driven by the remocon codes,
  wherein in response to an instruction issued from the program reserve control unit, a remocon code corresponding a selected function is output from the storage unit to drive the infrared ray signal emitting portion, and an output of the infrared ray signal emitting portion is received by a remocon receiving portion of the external picture recording apparatus, thereby enabling a picture recording reserve in the external picture recording apparatus to be controlled;
  a video/sound output terminal for outputting a video signal and a sound signal of a desired channel, wherein the video and sound signal output from the video/sound output terminal is input to the external picture recording apparatus through the reserve program control unit, the infrared ray signal emitting portion, and the remocon receiving portion of the external picture recording apparatus so that the reserve picture recording of the desired channel can be performed; and
  the storage unit of the program reserve control unit further configured to store information representing whether or not the external picture recording apparatus includes a receiver tuner, and on the basis of the information stored in said storage unit representing whether or not said external picture recording apparatus includes the receiver tuner, the program reserve control unit performs the control in such a way that in a case where the external picture recording apparatus includes the receiver tuner, the external picture recording apparatus receives, as an input, a signal output from the receiver tuner, and in a case where the external picture recording apparatus does not include the receiver tuner, the external picture recording apparatus receives, as an input, the video and sound signals of the desired channel output from the television receiver, thereby enabling the picture recording reserve of the desired channel to be executed.

* * * * *